Dec. 5, 1961 R. C. DOUGHERTY 3,012,103

REVERSING CLIP FOR TWO-PARTY LINE

Filed Sept. 4, 1959

INVENTOR.
RONALD C. DOUGHERTY
BY
McMorrow, Berman & Davidson
ATTORNEYS

United States Patent Office 3,012,103

Patented Dec. 5, 1961

3,012,103

REVERSING CLIP FOR TWO-PARTY LINE

Ronald C. Dougherty, 3908 Vermont Ave., Arlington, Va.

Filed Sept. 4, 1959, Ser. No. 838,344
5 Claims. (Cl. 179—98)

The present invention appertains generally to improvements in electrical equipment and in particular, relates to a novel and improved reversing clip for attachment to the protector head of telephone central office equipment.

In telephone operation, there is a central office wherein a cable head it situated. The cable head includes a protector head where outside cables terminate and to which the office lines are attached. The outside cables, which run from the subscriber's homes, terminate at the protector head to which the office lines are connected, the purpose of the protector head being to protect the equipment inside the office from outside voltage that may enter the office through the outside cables.

In connection with two-party lines, it is possible, due to incorrect splicing of outside cables or other accidental reasons, that the polarity will become reversed. When this accidental condition exists, it results in the accidental ringing of the wrong telephone. As is known in the operation of a two-party line, the telephone of one subscriber is rung over the ring side of the line while the other telephone or station is rung over the tip side of the line, each telephone having a "ring" and a "tip." However, when the polarity becomes reversed, then the wrong telephone will be rung with the telephone, which should be rung over the ring side being rung over the tip side.

To correct this accidental reversal of polarity, an attendant at the central office will insert a reversing clip in the subscriber's line, which clip will reverse the polarity by crossing over the lines and establishing the correct circuit. This is only a temporary corrective measure which permits proper operation of the party line until the cause of the trouble can be found and corrected.

It has been found that conventional reversing clips have several disadvantages which prevent their simple and effective use. In this regard, because of the need to exercise immediate, swift and sure correction of the difficulty that arises because of the reversed polarity, it is essential that the reversing clip be of a simple nature permitting fast and effective installation and providing complete and trouble-free mounting.

With a conventional reversing clip, it has been found that the clip is difficult to insert into position and oftentimes will produce a strain on the protective heat coil which is carried by the clip. Furthermore, it has been found that a conventional clip can easily be jarred loose by accidental knocking thereagainst and, such will result in an opening of the circuit.

Thus, a primary object of the present invention is to provide a reversing clip which can be easily and simply inserted into place and which cannot be accidentally jarred or knocked loose.

A further important object of this invention is to provide a reversing clip which can be inserted and held in place without imposing any strain on the protective heat coil.

A further important object of the present invention is to provide a reversing clip which is extremely simple and compact, which can be manufactured at a cost commensurate with the cost of manufacture of conventional clips and which is sturdy for long wear and use.

In its preferred form, the reversing clip of the present invention comprises two body portions connected by crossed wires, each body portion being a thin rectangular body of insulating material having contact plates on its upper and lower faces and having a rear end adjacent which the contact plates have terminals for attachment to the reversing wires. The body has an opening intermediate its ends at about the center point, the opening being transverse of the upper and lower faces and passing through the lower face and being provided to support a protective heat coil. The front end of the body is enlarged and rounded and serves as a cam or leverage surface in the insertion of the clip and the elongation of the body aided by the front end serves to effectively lock or anchor the clip in place.

The foregoing and ancillary objects are attained by this invention, the preferred embodiment of which is set forth in the following description and illustrated in the attached drawing, wherein.

Figures 1, 2, 3, 4:
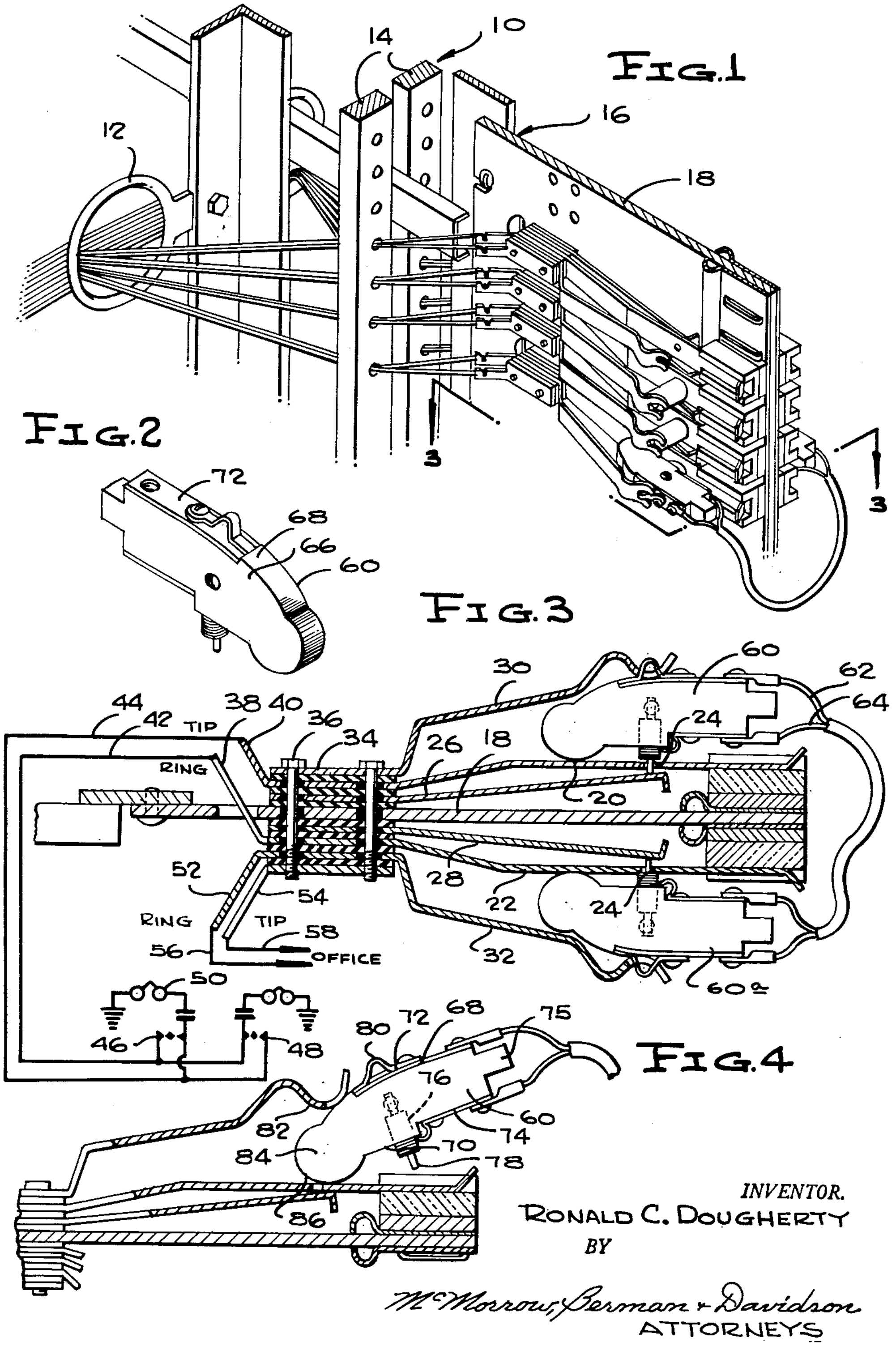
FIGURE 1 is a view in perspective of a portion of the vertical frame which is a part of the equipment in a telephone central office and illustrating the reversing clip assembly of this invention in place in the protective head.
FIGURE 2 is a perspective view of the clip per se.
FIGURE 3 is a transverse sectional view taken on line 3—3 of FIGURE 1 and showing diagrammatically the wiring arrangement for a two-party line; and, FIGURE 4 is a detailed horizontal sectional view showing the insertion of a clip into place in the protector head.

In the drawing, a conventional vertical frame 10 is shown, the frame being a part of the equipment in a telephone central office and being provided for receiving the cables from the outside and the lines from inside the office. The frame 10 includes forming rings 12 and forming strips 14 and a protector head 16.

On each side of the ground bar 18 of the protector head, there are arranged in pairs, the outside and office connections for each telephone line.

Considering FIGURE 3, there are two strips 20 and 22 on each side of the ground bar, the strips having openings 24 exposing the inner spring contacts 26 and 28 which are "home" contacts. Spring contacts 30 and 32 are provided outside the strips and are "office" contacts. The strips and contacts are commonly mounted on the ground bar with suitable insulating spacers 34 by the bolts 36.

Lugs 38 and 40 receive the pair of cables 42 and 44 which constitute the "ring," "tip" lines and extend to the transmitters and receivers 46 and 48 for each subscriber of the two-party line. Each has a ringer 50 and a ring station and tip station. Lugs 52 and 54 receive the lines 56 and 58 which extend from the central office equipment and constitute "ring" and "tip" lines.

If the conditions are correct and no reversed polarity exists, only a conventional heat coil is connected between the contacts 26 and 30 and 28 and 32, the coils passing through the openings 24. However, if the polarity is reversed and the wrong line is being rung, then the reversing clip of the present invention must be inserted into the protector head of the particular line to correct the line.

The reversing clip assembly includes two identical clips 60 and **60*a* connected by crossed wires 62 and 64**.

The clip per se, as shown in FIGURES 2–4, includes a thin rectangular body portion 66 of insulating material and having flat sides and opposing outer and inner faces 68 and 70. Contact plates 72 and 74 are mounted on the faces and connected adjacent the rear end by screws to the wires.

Intermediate its ends and approximately at the center point, the body portion is formed with an opening 76 which extends transversely between the outer and inner faces and passes through the inner face to receive the heat coil 78. The heat coil wire connection is connected to the plate 72 while the plate 74 has a protuberance 80 which hooks into the offset apertured hook 82 of the contacts 30 and 32.

The front end 84 of the body portion is enlarged and rounded, having a rounded outer surface 86 which extends inwardly of the inner face of the body portion and extends well forwardly thereof. The rounded end serves as a cam surface in installing the body portion in place between the contacts, as shown in FIGURE 4 and aids in securely locking the body portion in place since it lies well forwardly of the protuberance and the heat coil. In addition, because of such end, the contacts 30 and 32 are spread outwardly, enabling the heat coils to be easily inserted into the openings 24 without imposing any strain on the heat coils.

Thus, it can be seen that the length of the body portion added to the central placement of the heat coil and anchoring clip or protuberance and the enlarged rounded front end enable the body portion to be easily inserted into place, without any possibility of damaging the heat coil and without any fear that the body portion can be accidentally joined or knocked loose.

What is claimed is:

1. In a telephone vertical frame assembly, a reversing clip assembly for correcting the reversed polarity in a two-party line, said assembly including two body portions connected by crossed wires and each body portion having a cam leading end and a rear end and a heat coil carried intermediate the leading end and the rear end and being approximately centrally disposed between the ends.

2. In a reversing clip assembly of the type described, a body portion of insulating material and having opposing inner and outer faces and opposing ends, one of said ends being enlarged and rounded and said inner face having an opening centrally disposed between the ends to receive a heat coil.

3. In a reversing clip assembly of the type described, a body portion of insulating material and having opposing inner and outer faces and opposing ends, one of said ends being enlarged and rounded and said inner face having an opening centrally disposed between the ends to receive a heat coil, and said outer face having a protuberance forming a part of a hook connection.

4. In a reversing clip assembly of the type described for correcting the reversed polarity in a two-party line, a body portion of insulating material having a front and rear end, and an inner side, said front end at its inner side being rounded and constituting a cam surface and said body intermediate the ends and substantially at the center point being formed with an opening passing through the inner side transversely thereof within which a heat coil can be socketed.

5. In a reversing clip assembly of the type described for correcting the reversed polarity in a two-party line, a body portion of insulating material having a front and rear end, and an inner side, said front end at its inner side being rounded and constituting a cam surface and said body intermediate the ends and substantially at the center point being formed with an opening passing through the inner side transversely thereof within which a heat coil can be socketed, said front end being rounded and enlarged.

References Cited in the file of this patent

UNITED STATES PATENTS 1,641,286 Mueller --------------- Sept. 6, 1927